United States Patent
Dibbad et al.

(10) Patent No.: US 12,509,099 B2
(45) Date of Patent: Dec. 30, 2025

(54) POWER DELIVERY NETWORK DEGRADATION DETECTION IN A COMPUTING DEVICE

(71) Applicant: QUALCOMM INCORPORATED, San Diego, CA (US)

(72) Inventors: Vijayakumar Ashok Dibbad, Bangalore (IN); Jeffrey Gemar, San Diego, CA (US); Shree Krishna Pandey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 18/338,576

(22) Filed: Jun. 21, 2023

(65) Prior Publication Data

US 2024/0425063 A1    Dec. 26, 2024

(51) Int. Cl.
*B60W 50/02* (2012.01)
*B60W 50/035* (2012.01)
*B60W 50/14* (2020.01)

(52) U.S. Cl.
CPC ...... *B60W 50/0205* (2013.01); *B60W 50/035* (2013.01); *B60W 50/14* (2013.01); *B60W 2050/143* (2013.01); *B60W 2050/146* (2013.01)

(58) Field of Classification Search
CPC ........... B60W 50/0205; B60W 50/035; B60W 50/14; B60W 2050/143; B60W 2050/146; G01R 31/31721; G01R 31/318575
See application file for complete search history.

(56) References Cited

U.S. PATENT DOCUMENTS

| | | | |
|---|---|---|---|
| 9,864,018 B2* | 1/2018 | Lee | G01R 31/40 |
| 2012/0013353 A1* | 1/2012 | Frech | G01R 27/16 |
| | | | 324/649 |
| 2012/0013356 A1* | 1/2012 | Eckert | G01R 31/31721 |
| | | | 324/750.3 |
| 2017/0219654 A1* | 8/2017 | Bocage | G01R 31/008 |
| 2018/0143227 A1 | 5/2018 | Novak et al. | |

OTHER PUBLICATIONS

International Search Report and Written Opinion—PCT/US2024/030914—ISA/EPO—Sep. 16, 2024.

* cited by examiner

*Primary Examiner* — Ashley L Redhead, Jr.
(74) *Attorney, Agent, or Firm* — Smith Tempel Blaha LLC

(57) ABSTRACT

Degradation of a power delivery network (PDN) in a computing device may be detected as part of a self-test during booting of the computing device or a device subsystem. The computing device may be an automotive vehicle control system. A clock signal provided to logic circuitry supplied by the PDN may be modulated, and the modulation frequency may be varied over a range. Voltage droop values in the logic circuitry may be measured in response to the modulation frequencies over the range. Impedance values may be determined by determining an odd harmonic of each of the voltage droop values. The impedance values may be compared with thresholds, and an alert or other indication may be issued if one or more of the impedance values exceeds a threshold.

23 Claims, 8 Drawing Sheets

POWER DELIVERY NETWORK DEGRADATION DETECTION IN A COMPUTING DEVICE

FIELD

The present disclosure relates generally to electronic device testing, and more specifically, to power delivery network self-testing in a computing device.

BACKGROUND

In a complex electronic device, multiple subsystems may be integrated together in a system-on-a-chip or "SoC." The term "power delivery network" or "PDN" refers to a portion of an SoC, multi-chip package, circuit card, or other electronic system through which power is delivered to subsystems or other electronic components. A PDN may include voltage regulators, bypass capacitors, decoupling capacitors, a power plane, or other active or passive components. Aging or environmental stressors may degrade the PDN impedance, possibly resulting in voltage and timing margin failure in digital logic circuitry.

Methods for detecting PDN degradation have been developed. A PDN impedance profile, which indicates PDN impedance over a frequency range, may be characterized when an SoC is designed and tested, based on expected use cases. Thresholds may be derived from the impedance profile and stored in monitoring circuitry of the SoC that monitors for undesirable conditions. During operation of the SoC, the monitoring circuitry may compare sensed voltages (or proxies for voltage, such as a voltage-controlled oscillator frequency) in the SoC with the thresholds to attempt to detect PDN degradation.

Performing built-in self-testing in an electronic device prior to beginning mission-mode operation or at intervals during mission-mode operation is important to ensuring safety in systems commonly referred to as "safety-critical," such as an automotive vehicle electronic control unit (ECU). An expectation of Advanced Driver Assistance Systems (ADAS) is that proper operation of subsystems is verified during the start-up processes through which the vehicle or a subsystem thereof (e.g., during subsystem booting) is readied for operation.

It would be desirable to provide improved systems, methods, and other solutions for detecting PDN degradation at booting time as well as during mission-mode operation of a safety-critical system, such as an automotive vehicle control system.

SUMMARY

Systems, methods, and other examples are disclosed for detecting power delivery network degradation in a computing device.

One aspect of the disclosure provides a method for detecting power delivery network (PDN) degradation in a computing device. The method may include modulating a clock signal provided to logic circuitry supplied by the PDN. Modulating the clock signal may include gating the clock signal alternately on and off at a duty cycle of a modulation signal. The method may also include varying the modulation frequency of the modulation signal over a range. The method may further include measuring a plurality of voltage droop values of a signal in the logic circuitry in response to each of a corresponding plurality of modulation frequencies in the range. The method may yet further include determining a plurality of impedance values. Determining the plurality of impedance values may include determining a value of an odd harmonic of each of the plurality of voltage droop values. The method may still further include comparing each of the plurality of impedance values with a corresponding threshold. The method may include providing an indication when at least one of the impedance values exceeds the corresponding threshold.

Another aspect of the disclosure provides a system for detecting PDN degradation in a computing device. The system may include at least one voltage sensor coupled to a signal path in logic circuitry that is powered by the PDN. The system may also include clock modulation circuitry configured to modulate a clock signal and provide the modulated clock signal to the logic circuitry in response to a modulation signal. The clock modulation circuitry may be configured to gate the clock signal alternately on and off at a duty cycle of the modulation signal. The system may further include test control circuitry. The test control circuitry may be configured to provide the modulation signal to the clock modulation circuitry. The test control circuitry may be configured to vary the modulation frequency of the modulation signal over a range. The test control circuitry may also be configured to receive a plurality of voltage droop values from the voltage sensor in response to each of a corresponding plurality of modulation frequencies in the range. The test control circuitry may further be configured to determine a plurality of impedance values, which may include determining the value of an odd harmonic of each of the plurality of voltage droop values. The test control circuitry may yet further be configured to compare each of the plurality of impedance values with a corresponding threshold. The test control circuitry may still further be configured to provide an indication when at least one of the impedance values exceeds the corresponding threshold.

Another aspect of the disclosure provides an apparatus for detecting power delivery network degradation. The apparatus may include means for modulating a clock signal provided to logic circuitry supplied by the PDN. The means for modulating the clock signal may include means for gating the clock signal alternately on and off at a duty cycle of a modulation signal. The apparatus may also include means for varying the modulation frequency of the modulation signal over a range. The apparatus may further include means for measuring a plurality of voltage droop values of a signal in the logic circuitry in response to each of a corresponding plurality of modulation frequencies in the range. The apparatus may yet further include means for determining a plurality of impedance values. The means for determining the plurality of impedance values may include means for determining a value of an odd harmonic of each of the plurality of voltage droop values. The apparatus may still further include means for comparing each of the plurality of impedance values with a corresponding threshold. The apparatus may include means for providing an indication when at least one of the impedance values exceeds the corresponding threshold.

Another aspect of the disclosure provides a computer-readable medium for detecting PDN degradation. The computer-readable medium may comprise a non-transitory computer-readable medium having instructions stored thereon in computer-executable form. The instructions, when executed by a processing system, may configure the processing system to control modulation of a clock signal provided to logic circuitry powered by the PDN using a modulation signal. This control of the clock signal modulation may include control of gating the clock signal alternately on and off at a duty cycle of the modulation signal. This control of the clock signal modulation may also include varying a modulation frequency of the clock signal over a range. The instructions, when executed by the processing system, may also configure the processing system to receive a plurality of voltage droop values from a voltage sensor in response to each of a corresponding plurality of modulation frequencies in the range. The instructions, when executed by the processing system, may further configure the processing system to determine a plurality of impedance values. This may include the processing system being configured to determine a value of an odd harmonic of each of the plurality of voltage droop values. The instructions, when executed by the processing system, may yet configure the processing system to compare each of the plurality of impedance values with a corresponding threshold. The instructions, when executed by the processing system, may still further configure the processing system to provide an indication when at least one of the impedance values exceeds the corresponding threshold.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." The word "illustrative" may be used herein synonymously with "exemplary." Any aspect described herein as "exemplary" or "illustrative" is not necessarily to be construed as preferred or advantageous over other aspects.

In accordance with exemplary embodiments, systems and methods for detecting power delivery network (PDN) degradation in a computing device are disclosed. One aspect of such systems and methods relates to determining PDN impedance. The PDN impedance may be determined as part of self-testing procedures during booting of the computing device. In an exemplary embodiment, the PDN may supply a processing system or subsystem of a computing device that controls aspects of the operation of an automotive vehicle.

Figure 1:
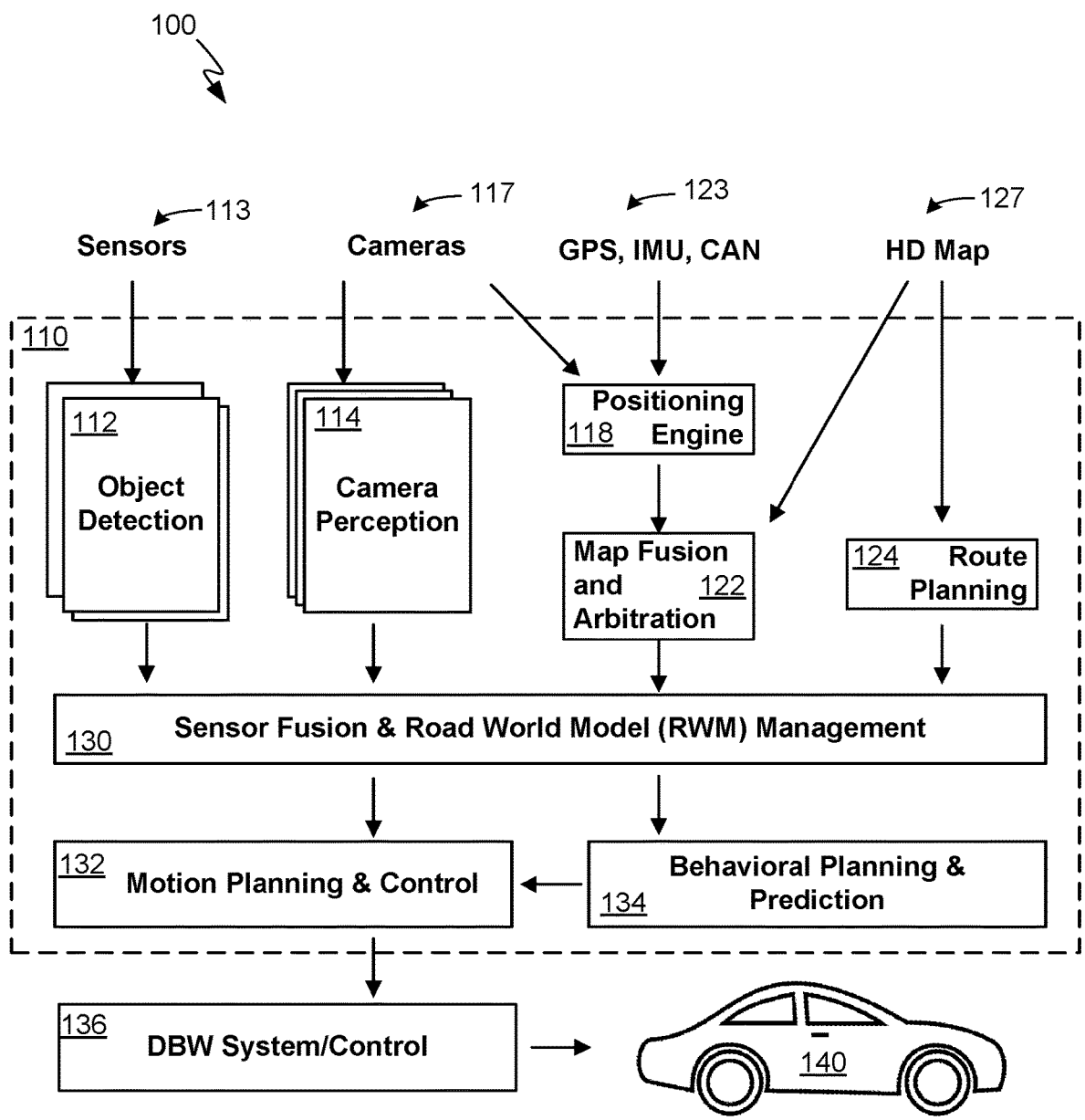
FIG. 1 is a functional block diagram of an automotive self-driving system, in accordance with exemplary embodiments.

In FIG. 1, an automotive self-driving system 100 is shown in functional block diagram form. The automotive self-driving system may include a processing module 110, and a drive-by-wire (DBW) system controller 136. The processing module 110 may include one or more object detection elements 112 and one or more camera perception elements 114. For example, an object detection element 112 may receive inputs from one or more sensors 113; and a camera perception element 114 may receive input from one or more cameras 117.

In an exemplary embodiment, the processing module 110 also may include a positioning engine 118, a map fusion and arbitration element 122, and a route planning element 124. In an exemplary embodiment, the positioning engine 118 may receive inputs from the cameras 117 and from positioning inputs 123. The positioning inputs 123 may be, for example, global positioning system (GPS) data, inertial measurement unit (IMU) data, controller area network (CAN) data, etc. For example, the map fusion and arbitration element 122 and the route planning element 124 may receive map inputs from a high definition map element 127.

In an exemplary embodiment, the processing module 110 also may include a sensor fusion and road world model (RWM) management element 130, a motion planning and control element 132, and a behavioral planning and prediction element 134. In an exemplary embodiment, the sensor fusion and RWM management element 130 may receive inputs from the object detection element 112, the camera perception element 114, the map fusion and arbitration element 122, and the route planning element 124 to develop a road world model. In an exemplary embodiment, a road world model may be an intelligent world model for an autonomous self-driving automobile.

In an exemplary embodiment, the sensor fusion and RWM management element 130 may provide outputs to the motion planning and control element 132 and the behavioral planning and prediction element 134. The behavioral planning and prediction element 134 may also provide an output to the motion planning and control element 132. An output of the processing module 110 may be provided to the DBW system controller 136, which may provide self-driving instructions to an automobile 140.

Figure 2:
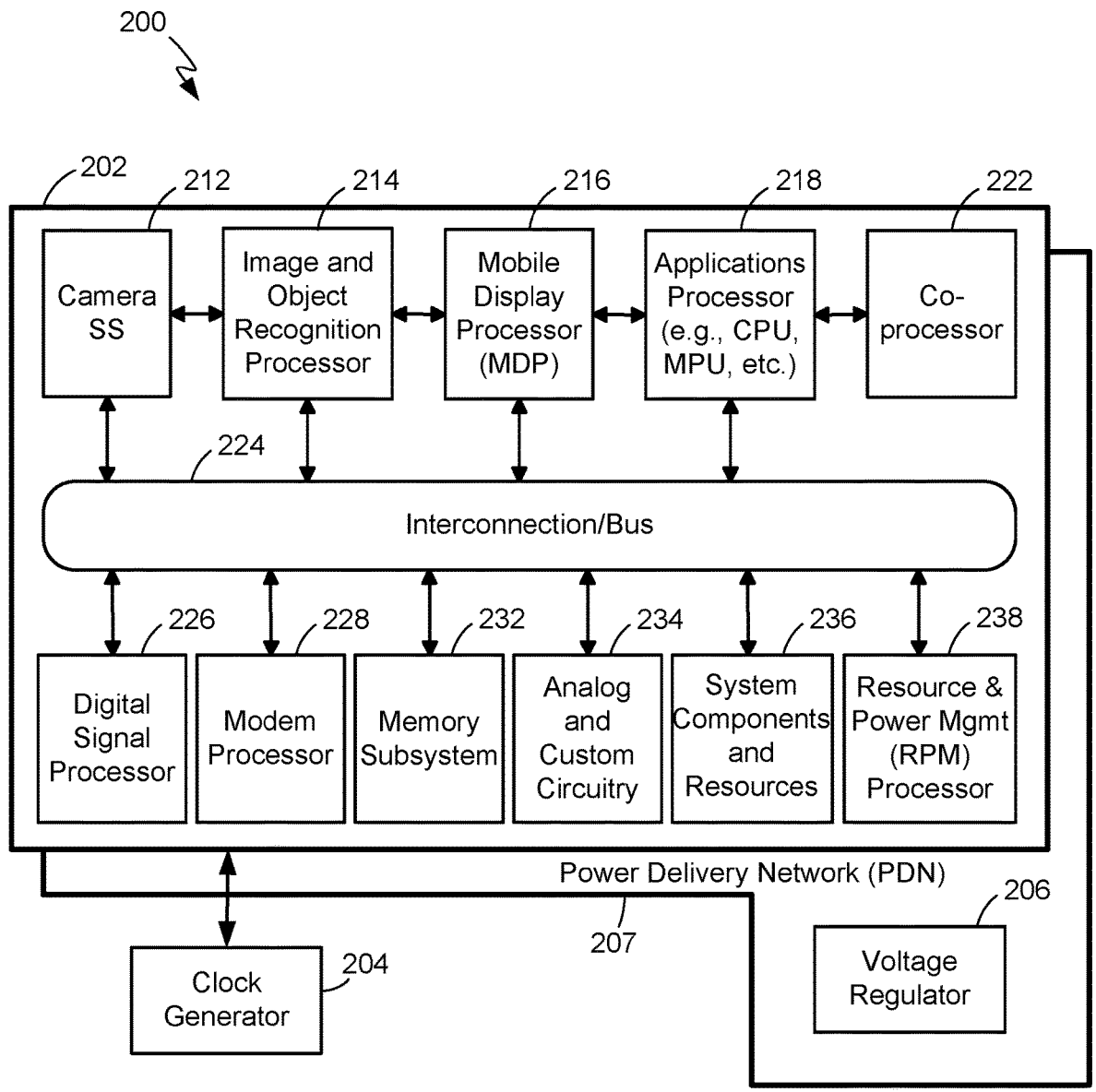
FIG. 2 is a block diagram of a processing system, including a power delivery network (PDN), in accordance with exemplary embodiments.

In FIG. 2, a processing system 200 is shown in block diagram form. The processing system 200 may include a system-on-a-chip (SoC) 202, a clock generator 204, and a voltage regulator 206. The processing system 200 may be configurable to provide the type of functionality described above with regard to the automotive self-driving system 100 (FIG. 1). The processing system 200 may be located in the same chip or distributed among multiple chips (e.g., chiplets).

The processing system 200 may include a PDN 207. Portions of the PDN 207, such as, for example, a power plane and decoupling capacitors (not separately shown), may be included in the SoC 202, while other portions of the PDN 207, such as, for example, the voltage regulator 206 and bypass capacitors (not separately shown), may be external to the SoC. For example, the SoC 202 and voltage regulator 206, etc., may be mounted on a circuit card (not shown). In an exemplary embodiment in which the processing system 200 is distributed among multiple chips (e.g., chiplets), the PDN 207 may be distributed among the multiple chips or chiplets.

In an exemplary embodiment, the SoC 202 may include a camera subsystem 212, an image and object recognition processor 214, a mobile display processor (MDP) 216, an applications processor (e.g., CPU) 218, and a coprocessor 222. The image and object recognition processor 214 may be coupled to the camera subsystem 212 and the MDP 216. The coprocessor 222 may be coupled to the applications processor 218. In an exemplary embodiment, the camera subsystem 212, the image and object recognition processor 214, and the MDP 216 may cooperate to provide a visual display to an operator of the automobile 140 (FIG. 1).

In an exemplary embodiment, the SoC 202 may include a digital signal processor (DSP) 226, a modem processor 228, a memory 232, analog and custom circuitry 234, system components and resources 236, and a resource and power management (RPM) processor 238. In an exemplary embodiment, each of the elements in the SoC 202 except the coprocessor 222 may be connected to a bus or system interconnect 224. In an exemplary embodiment, certain processing tasks may be shared between the applications processor 218 and the coprocessor 222.

In an exemplary embodiment, the DSP 226 may perform processing on digital signals. The modem processor 228 may provide wireless connectivity. The memory 232 may be, for example, dynamic random access memory (DRAM), static RAM, flash memory, etc. The memory 232 may comprise a combination of persistent and non-persistent memory types. Although depicted in FIG. 2 as a single element for purposes of clarity, the memory 232 may also be distributed memory.

In an exemplary embodiment, the analog and custom circuitry 234 may provide analog signal processing. The system components and resources 236 may provide various signal processing and signal conditioning circuitry including, for example, voltage regulators, oscillators, phase-locked loops, peripheral memory controllers, memory controllers, system controllers, access ports, timers, and other components used to support processors and software clients. The RPM processor 238 may control aspects of supplying power to processing components, such as managing power modes for power conservation and performance.

The clock generator 204 may provide a system clock signal to the SoC 202. Although not shown in FIG. 2 for purposes of clarity, the SoC 202 may include a clock tree configured to distribute clock signals to various logic circuitry components. The various subsystems of the SoC 202, such as the camera subsystem 212, the image and object recognition processor 214, the MDP 216, the applications processor 218, the DSP 226, the modem processor 228, etc., may similarly include clock trees configured to distribute clock signals within those components.

Figure 3:
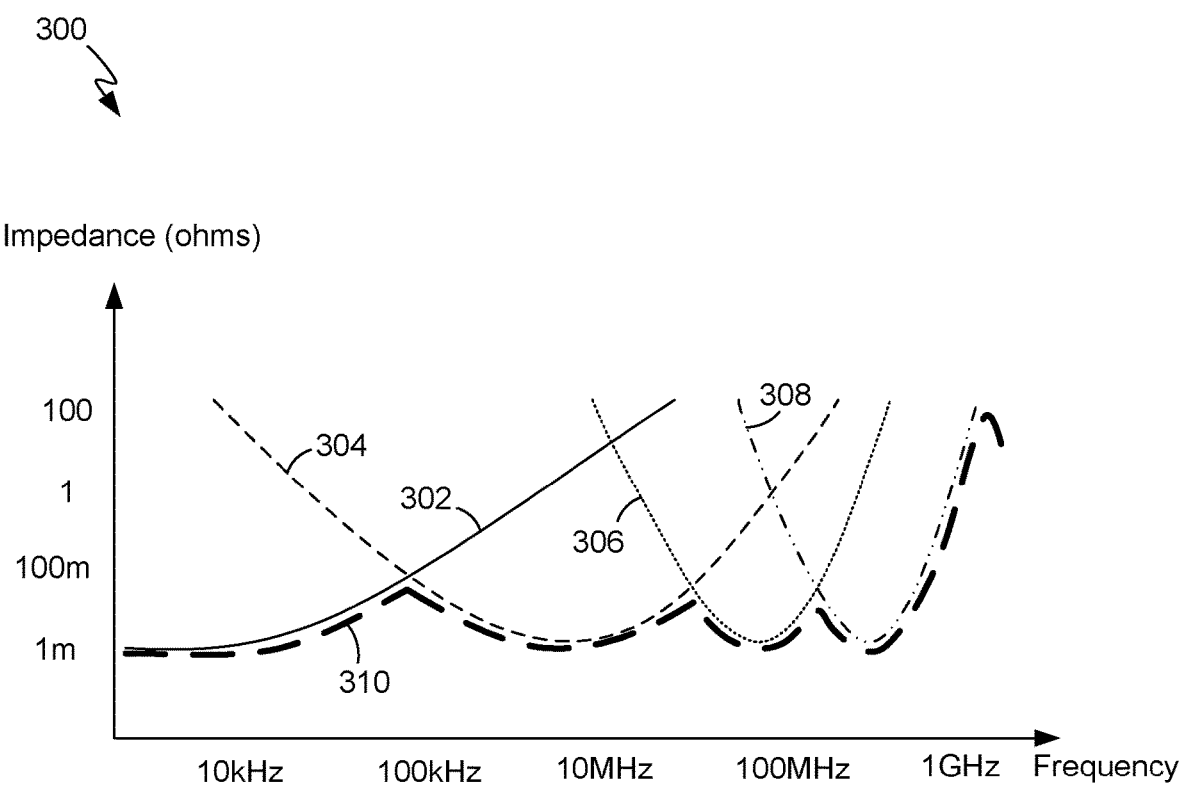
FIG. 3 is a plot of impedance of PDN components over a frequency range, in accordance with exemplary embodiments.

In FIG. 3, a plot 300 illustrates the principle that different components of the PDN 207 (FIG. 2) may be stimulated by different frequencies within a clock signal frequency range. Accordingly, the different components of the PDN may contribute to the overall PDN impedance to different extents over those different portions of the frequency range. Referring briefly again to FIG. 2, the voltage regulator 206 may supply power at a regulated voltage to the SoC 202 through the PDN 207. A first curve 302 (FIG. 3) illustrates an example of a PDN impedance effect by the voltage regulator 206. A second curve 304 (FIG. 3) illustrates an example of a PDN impedance effect by bypass capacitors (not shown in FIG. 2), which may be coupled in a path between the voltage regulator 206 and the SoC 202. A third curve 306 (FIG. 3) illustrates an example of a PDN impedance effect by decoupling capacitors (not shown in FIG. 2) that may be included (i.e., on-die) in the SoC 202. A fourth curve 308 (FIG. 3) illustrates an example of a PDN impedance effect by an SoC power plane (not shown in FIG. 2) that may distribute power to the various SoC subsystems and other circuitry. Although not represented by any curve in FIG. 3, SoC package lead inductance may also vary with frequency and thus contribute to PDN impedance effects.

A PDN impedance profile 310 may be compiled or constructed from portions of the curves 302-308. The PDN impedance profile 310 may generally characterize the PDN impedance over the frequency range. Such an impedance profile may be constructed during the SoC design (e.g., simulation) and testing phases in a manner understood by one of ordinary skill in the art. A frequency range of the PDN impedance profile 310 may be, for example, from about 10 kHz to 1 GHz.

Impedance of the PDN 207 (FIG. 2) may deviate from a PDN impedance profile as a result of aging of PDN components, mechanical damage to PDN components, operation in excessively hot or cold climates, etc. Such PDN degradation may cause voltage droop in the power being supplied to SoC circuitry. In some methods for detecting PDN degradation, deviation of a frequency produced by a voltage-controlled oscillator (VCO) in the SoC from an expected or nominal frequency may serve as a proxy for voltage droop. In some methods for detecting PDN degradation, voltage droop and thus the expected VCO frequency may be based on the use case under which the SoC is then operating. The VCO frequency may be monitored, and if it is detected that the frequency deviates from the expected frequency by more than a threshold amount associated with a use case, the power supply voltage may be increased and/or the clock frequency may be decreased to compensate. However, very high PDN impedance can result in voltage droop beyond the compensation capability of such methods. Further, although the compensation may be determined while the SoC is in mission-mode operation, the compensation may not be applied until the next time the SoC is booted. Also, such methods may be limited by use cases. A use case under which an SoC is actually operating in mission mode may stimulate voltage droop in only portions of the frequency range of the type described above with regard to FIG. 3, and those portions may fail to include a portion of the frequency range associated with a degraded PDN component. In contrast with the foregoing methods, the systems, methods and other solutions disclosed herein for detecting PDN degradation may stimulate voltage droop across a large frequency range. Further, the systems, methods and other solutions disclosed herein may operate during booting of the SoC alternatively to (or in addition to) during mission-mode operation.

Figure 4:
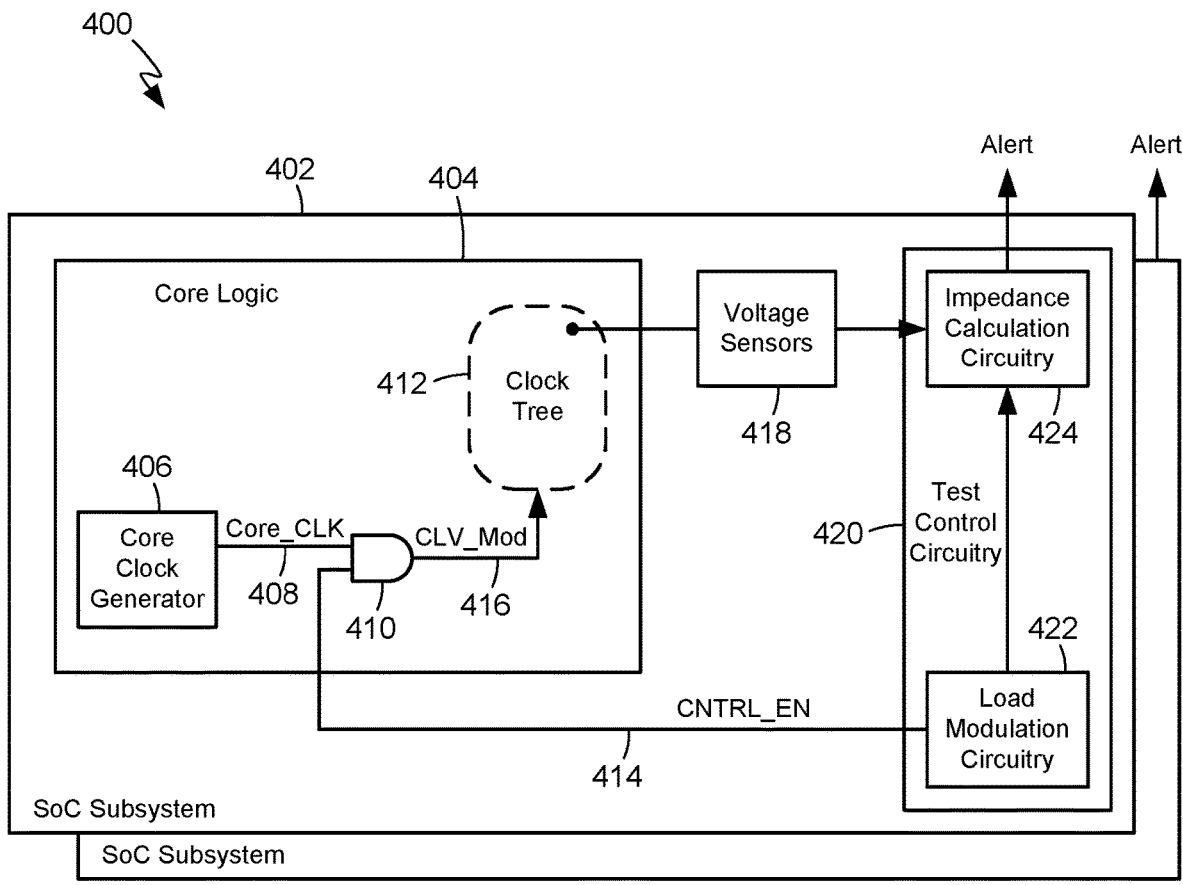
FIG. 4 is a block diagram of a subsystem having a system for detecting degradation of the PDN, in accordance with exemplary embodiments.

In FIG. 4, a system 400 comprising one or more SoC subsystems 402 is shown in block diagram form. Each SoC subsystem 402 may be, for example, any of the subsystems described above with regard to FIG. 2, such as the applications processor 218, the modem processor 228, the memory subsystem 232, etc. Multiple SoC subsystems 402 may be located in the same chip or in multiple chips (e.g., chiplets). The SoC subsystem 402 may include core logic 404 configured to provide the core functionality of the particular subsystem. Accordingly, the core logic 404, for example in the case of an applications processor, may include a processor (not separately shown) or multiple processor cores configured to execute application software. In the case of memory, the core logic 404 may include storage cell arrays, memory control logic, built-in self-test logic, or other circuitry associated with memory.

In addition, the core logic 404 may include a core clock generator 406 configured to generate a subsystem clock signal 408 (Core_CLK). The core clock generator 406 may comprise, for example, a phase-locked loop (PLL) and may operate in response to a system clock signal (not shown) provided to other subsystems in addition to the subsystem 402. A logical-AND gate 410 or other clock gating circuit may be interposed between the output of the core clock generator 406 and an input of a clock tree 412. The logical-AND gate 410 may be configured to gate or modulate the subsystem clock signal 408 (Core_CLK) alternately on and off in response to a modulation signal 414 (CNTRL_EN). The output of the logical-AND gate 410 may provide a modulated clock signal 416 (CLV_Mod) to the input of the clock tree 412. The clock tree 412 may distribute the modulated clock signal 416 to logic components (not individually shown) of the core logic 404. The clock tree 412 may be of any size and may have any topology or configuration. For example, a clock tree 412 in a subsystem 402 comprising a processor may have a different configuration than a clock tree 412 in a different subsystem 402 comprising memory.

The SoC subsystem 402 may also include one or more voltage sensors 418. A voltage sensor 418 may be located, for example, in a signal path of a logic component that operates in response to a clock signal provided by the clock tree 412. The signal path in which the voltage sensor 418 is located may be part of a critical timing path in the core logic 404. The critical timing path may fail to meet timing specifications if voltage droop in the signal path exceeds a threshold. Voltage droop exceeding such a threshold may sometimes be referred to as worst-case voltage droop. As understood by one of ordinary skill in the art, critical timing paths and worst-case voltage droop locations may be determined through simulations and testing during the SoC design and testing phase. Voltage droop in the signal at such a location that exceeds a threshold may adversely impact operation of the core logic 404. Nevertheless, voltage sensors 418 may be located in other locations. Although not shown in further detail for purposes of clarity, it is understood by one of ordinary skill in the art that a voltage sensor 418 may comprise a resistance, and the voltage may be sensed from the current drawn through the resistance by the component of the core logic 404 in operation.

The SoC subsystem 402 may further include test control circuitry 420. The test control circuitry 420 may include load modulation circuitry 422 and impedance calculation circuitry 424.

The load modulation circuitry 422 may be configured to provide the modulation signal 414 (CNTRL_EN). Although the manner in which the modulation signal 414 may be provided is described below, it may be noted here that the load modulation circuitry 422 may vary the frequency of the modulation signal 414 over a range. The impedance calculation circuitry 424 may be configured to receive measured voltage droop values from the one or more voltage sensors 418 in response to each of a number of modulation frequencies in the range. In this manner, the impedance calculation circuitry 424 may compile data comprising clock modulation frequencies and corresponding voltage droop values. From this data, and in a manner described below, the impedance calculation circuitry 424 may be configured to calculate or determine impedance values. The impedance calculation circuitry 424 may also be configured to compare each of the impedance values with a threshold. The impedance calculation circuitry 424 may further be configured to provide an indication, such as an alert, if the impedance calculation circuitry 424 determines that at least one of the calculated impedance values exceeds a threshold.

Although not shown in FIG. 4 for purposes of clarity, the test control circuitry 420 may be configured to operate in the manner described above through circuitry that may include one or more finite state machines, processors, memories, etc. Processors and memories described above with regard to FIG. 2 may be employed. A memory in which instructions are stored that, when executed, configure such a processor in the manner of the test control circuitry 420 may be referred to as a computer-readable medium.

Figure 5:
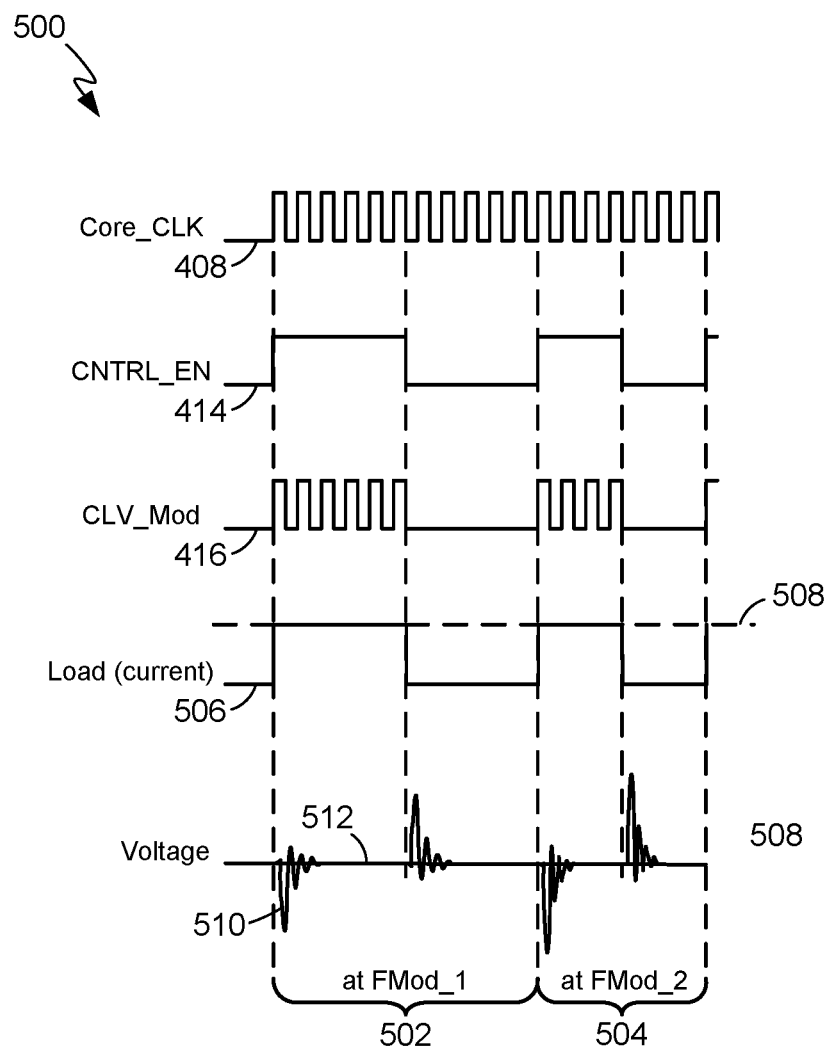
FIG. 5 is a waveform diagram 500 illustrating signal waveforms in an example of operation of the subsystem of FIG. 4, in accordance with exemplary embodiments.

In FIG. 5, a waveform diagram 500 illustrates an exemplary manner in which the test control circuitry 420 (FIG. 4) may provide the modulation signal 414 (CNTRL_EN) and determine impedance values based on measured voltage droop values. In the example shown in FIG. 5, two time intervals 502 and 504 are shown for purposes of clarity, but there many be many more such time intervals. During the first time interval 502, the modulation signal 414 has a first modulation frequency, which may be referred to as FMod_1. During the second time interval 504, the modulation signal 414 has a second modulation frequency, which may be referred to as FMod_2, which is different from the first modulation frequency. Although only two time intervals 502 and 504 and corresponding modulation frequencies are shown for purposes of clarity, the load modulation circuitry 422 (FIG. 4) may sweep or vary the modulation frequency of the modulation signal 414 through a range. For example, the load modulation circuitry 422 may vary the modulation frequency of the modulation signal 414 in a monotonically increasing manner from a lowest frequency to a highest frequency in the range. The range may span an operational frequency range of the core logic 404 (FIG. 4). For example, the range may span from about 10 kHz to 1 GHz.

The modulation signal 414 may have a 50 percent duty cycle, which may be characterized in terms of a number of cycles of the subsystem clock signal 408 (Core_CLK). For example, during the first time interval 502 the modulation signal 414 (CNTRL_EN) may have a period of 2N cycles of the subsystem clock signal 408, where the modulation signal 414 may be "on" (or in a logic-1 state) for N cycles of the subsystem clock signal 408 and "off" (or in a logic-0 state) for the next N cycles of the subsystem clock signal 408, where N is an integer greater than one. During the first time interval 502 the modulation frequency FMod_1 may be equal to the frequency of the subsystem clock signal 408 divided by 2N. During the second time interval 504 the modulation signal 414 may have a period of 2M cycles of the subsystem clock signal 408, where the modulation signal 414 may be on for M cycles of the subsystem clock signal 408 and off for the next M cycles of the subsystem clock signal 408, where M is another (i.e., different from N) integer greater than one. During the second time interval 504 the modulation frequency FMod_2 may be equal to the frequency of the subsystem clock signal 408 divided by 2M.

In response to the modulation signal 414 being on for N cycles of the subsystem clock signal 408 (Core_CLK) during the first time interval 502 while the modulation signal 414 (CNTRL_EN) has the first modulation frequency FMod_1, the logical-AND gate 410 (FIG. 4) may gate the subsystem clock signal 408 alternately on for N cycles and off for the next N cycles. Accordingly, during the first time interval 502 the modulated clock signal 416 (CLV_Mod) is on for N cycles (i.e., consists of cycles of the subsystem clock signal 408) and then off for the next N cycles (i.e., remains low or logic-0). In response to the modulation signal 414 being on for M cycles of the subsystem clock signal 408 during the second time interval 504 while the modulation signal 414 has the second modulation frequency FMod_2, the logical-AND gate 410 may gate the subsystem clock signal 408 alternately on for M cycles and off for the next M cycles. Accordingly, during the second time interval 504 the modulated clock signal 416 is on for M cycles (i.e., the modulated clock signal 416 consists of cycles of the subsystem clock signal 408) and then off for the next M cycles (i.e., remains low or logic-0). The modulated clock signal 416 is provided to various components of the core logic 404 (FIG. 4) through the clock tree 412.

Note that the load (current) signal 506, which may also be referred to as the average per-clock cycle dynamic current consumption (Icc_Dyn) remains at a constant positive value while the modulated clock signal 416 (CLV_Mod) is on (i.e., when the modulated clock signal 416 consists of cycles of the subsystem clock signal 408) and remains zero while the modulated clock signal 416 is off (i.e., when the modulated clock signal 416 remains low or logic-0). That is, the maximum amplitude of the load signal 506 remains a fixed or constant value 508 even as the frequency of the modulation signal 414 (CNTRL_EN) is varied. The principle of Fourier decomposition provides that the square waveform of the load signal 506 is composed of odd harmonic (1, 3, 5, . . . ) frequency sine waves. The voltage droops 510 (i.e., dynamic deviations from a nominal voltage 512) may be the composite effect of various harmonics of the load signal 506. Also, different harmonics of the load signal 506 may stimulate different portions of the PDN and result in different amounts of voltage droop 510 measured as described above with regard to FIG. 4. By sweeping or varying the frequency of the modulation signal 414 over a range of operating frequencies of the components supplied by the PDN, thereby modulating the frequency of the load signal 506 accordingly, the effect of a specific harmonic, such as the first harmonic, can be determined.

The load signal 506 or dynamic current consumption (Icc_Dyn) has a first-harmonic load current at any modulation frequency (FMod) of: Icc_Dyn*π/2. The relationship between voltage, current and impedance is linear, i.e., V(f)=I(f)*Z(f), so for any first-harmonic load current there is a first-harmonic voltage at the same modulation frequency (FMod). Varying the modulation frequency (FMod) stimulates the first-harmonic current and corresponding voltage droop in different portions of the PDN. A PDN impedance Z(f) at a location in the PDN where the voltage is measured is the first harmonic of the measured voltage droop divided by the first harmonic of the load (current). The above-described impedance calculation circuitry 424 (FIG. 4) can perform a Fast Fourier Transform (FFT) of the measured voltage droop, a FFT of the load, and divide the result of the FFT of the voltage droop by the result of the FFT of the load:

$$Z(f)=\text{FFT}(V\text{droop at }F\text{Mod})/\text{FFT}(\text{Load}).$$

Nevertheless, as the first harmonic of the load is fixed or constant, the load does not need to be measured, and the first harmonic of the load does not need to be calculated in real time. Rather, the impedance calculation circuitry 424 can perform an FFT of the measured voltage droop and divide the result by the predetermined value of the first harmonic of the load:

$$Z(f)=\text{FFT}(V\text{droop at }F\text{Mod})/\text{FFT}(Icc\_\text{Dyn}*\pi/2).$$

Figure 6:
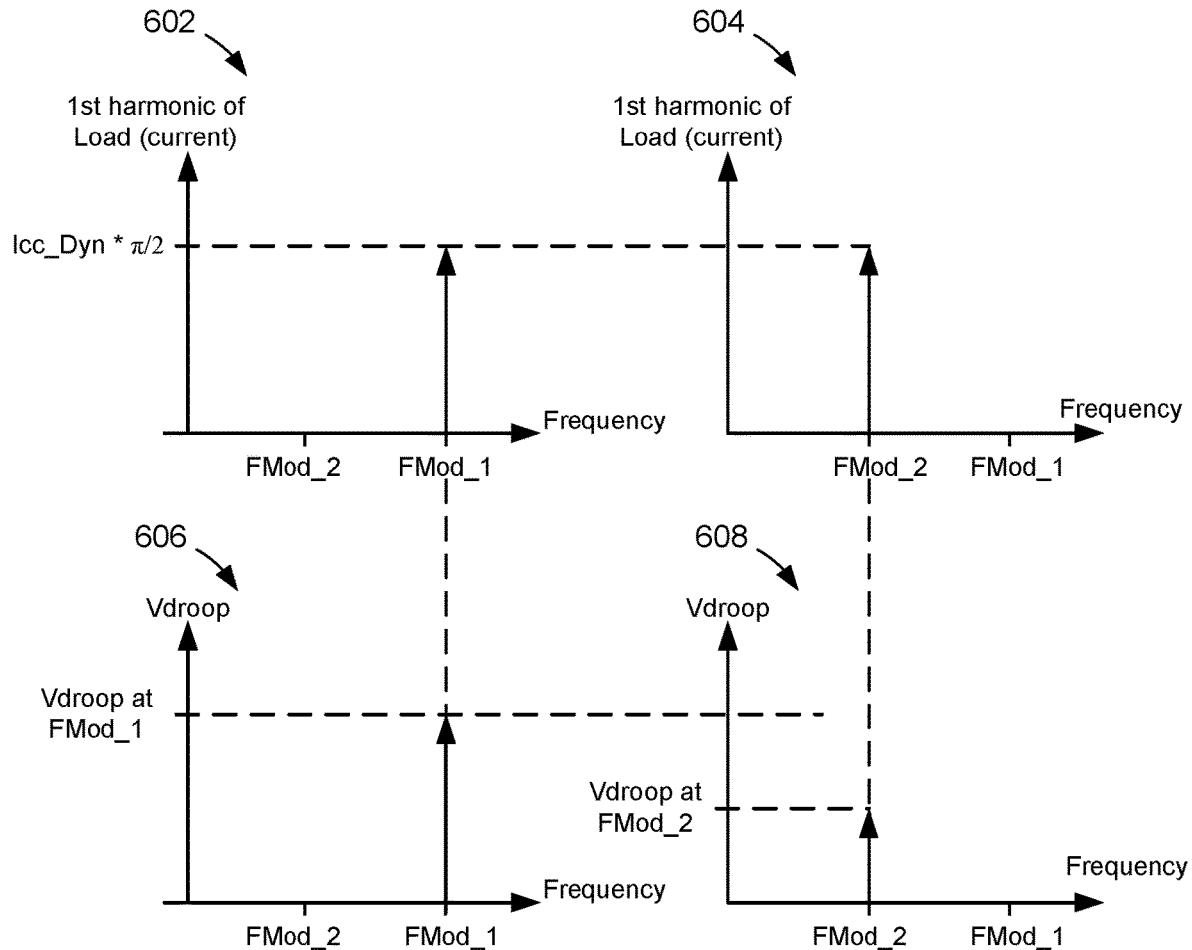
FIG. 6 shows plots of relationships among modulation frequency, voltage droop, and load current in the example of operation of the subsystem of FIG. 4, in accordance with exemplary embodiments.

In FIG. 6, a first plot 602 and a second plot 604 show that at both the first modulation frequency FMod_1 and at the second modulation frequency FMod_2 the first harmonic of the load current is Icc_Dyn*π/2. A third plot 606 and a fourth plot 608 show that the respective voltage droops are different at the first modulation frequency FMod_1 and the second modulation frequency FMod_2. It may be appreciated that, collectively, the plots 602-608 show that although the voltage droop may vary dynamically in response to the modulation, the first harmonic of the load current remains constant.

Figure 7:
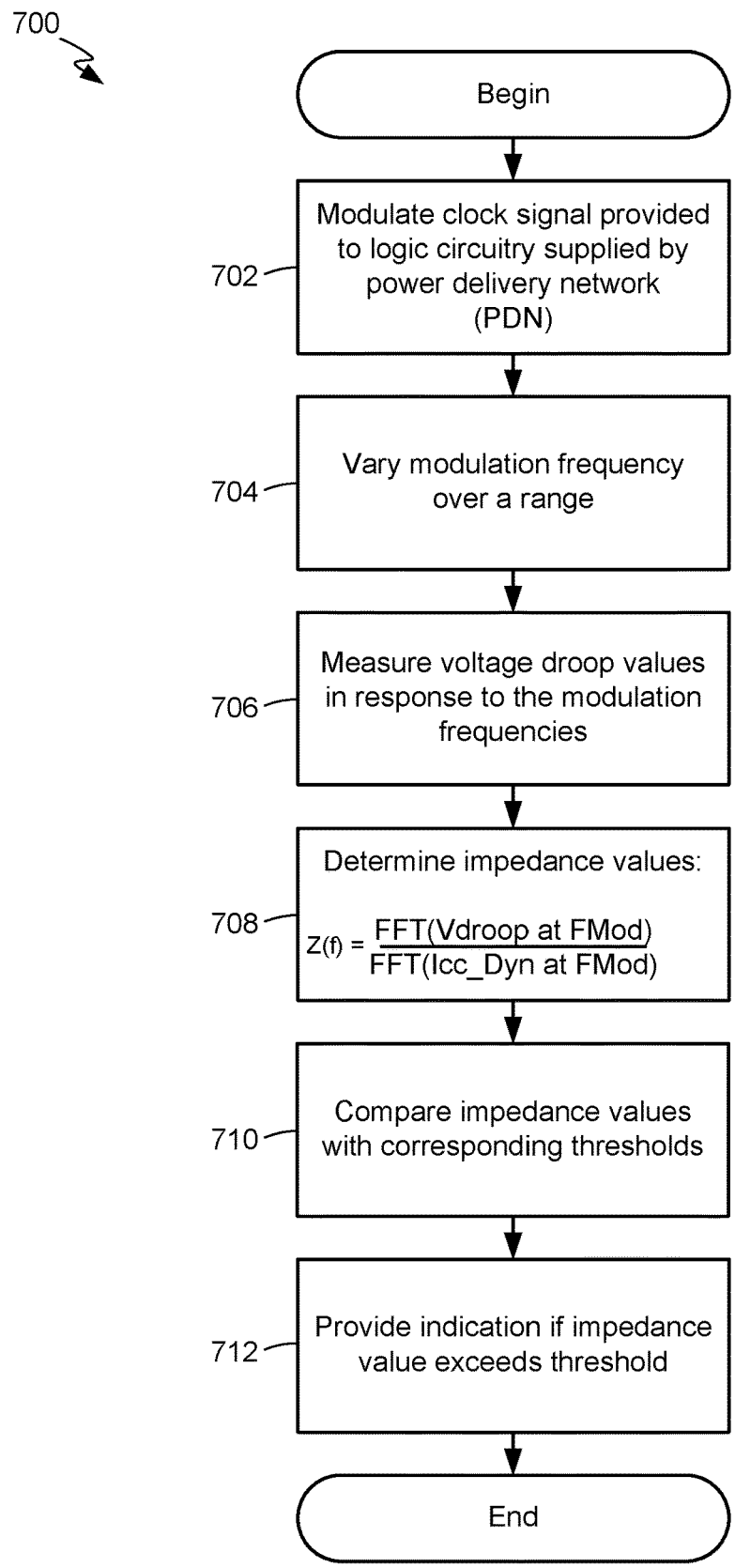
FIG. 7 is a flow diagram of a method for detecting PDN degradation in a computing device, in accordance with exemplary embodiments.

In FIG. 7, a method 700 for detecting PDN degradation is shown in flow diagram form. The method 700 may be performed during booting of an automotive vehicle processing system, such as an automotive SoC. The method 700 may additionally be performed during mission-mode operation of the vehicle, such as periodically while the vehicle is driving.

As indicated by block 702, the method 700 may include modulating the clock signal provided to logic circuitry supplied by the PDN. As indicated by block 704, the modulation frequency of the clock signal may be varied over a range, such as an operational frequency range of the logic circuitry.

As indicated by block 706, voltage droop values may be measured in response to various modulation frequencies in the range. For example, voltage droop values may be measured at each of a number of modulation frequencies in the range. The modulation frequencies at which voltage droop values are measured may be distributed, for example, evenly over the range. As described above, at least one voltage sensor is used to measure voltage droop, and that voltage sensor may be located in a portion of the PDN subject to worst-case voltage droop (as determined by simulations and testing during the chip design and testing phase). Nevertheless, in some embodiments two or more voltage sensors may be used to measure voltage droops in two or more locations, and an average of the measured voltage droop values may be determined and used in the manner described herein to determine an impedance value.

As indicated by block 708, impedance values may be determined. Determining an impedance value may include performing an FFT operation on a voltage droop value measured in response to one of the modulation frequencies. The impedance value may further be determined by dividing the result of the FFT operation (i.e., the first harmonic or other odd harmonic of the voltage droop value) by a first harmonic (or other odd harmonic) of the load current (Icc_Dyn). The first harmonic (or other odd harmonic) of the load current may be determined by performing an FFT operation on the load current. Nevertheless, as described above, the first harmonic of the load current remains constant over the range of modulation frequencies and has a value of Icc_Dyn*π/2, which may be predetermined and stored as a constant in the algorithm. Therefore, the impedance value may alternatively be determined by dividing the result of the above-referenced FFT operation (i.e., the first harmonic of the voltage droop value) by this predetermined or constant value.

While the primary (first) harmonic of voltage and current provide Z(f) at a primary frequency, subsequent odd harmonics (third, fifth, etc.) of voltage and current may be targeted to provide Z(f) at higher frequencies points (e.g., 3*Primary_frequency, 5*Primary_frequency, etc.).

As indicated by block 710, the impedance value resulting from the calculation described above with regard to block 708 may be compared with an impedance threshold. Alternatively, the result of FFT of the measured voltage droop value may be compared with a threshold value, since the first harmonic of the load current is a constant. The comparison may indicate whether the PDN impedance has degraded or deviated from an expected value. The expected value or threshold may be determined during the chip design and testing phase in a manner understood by one of ordinary skill in the art.

As indicated by block 712, an indication may be provided if it is determined (block 710) that the compared value exceeds the threshold. The indication may, for example, include alerting an operator of the vehicle using an visual or audible indication (e.g., on a vehicle dashboard). The alert may advise the operator of a potentially unsafe condition, to exercise addition caution, etc. Alternatively, or in addition, the indication may enter the vehicle into a fail-safe mode of operation. The indication may be provided to a vehicle safety subsystem (not shown) that initiates further actions based on the indication.

Figure 8:
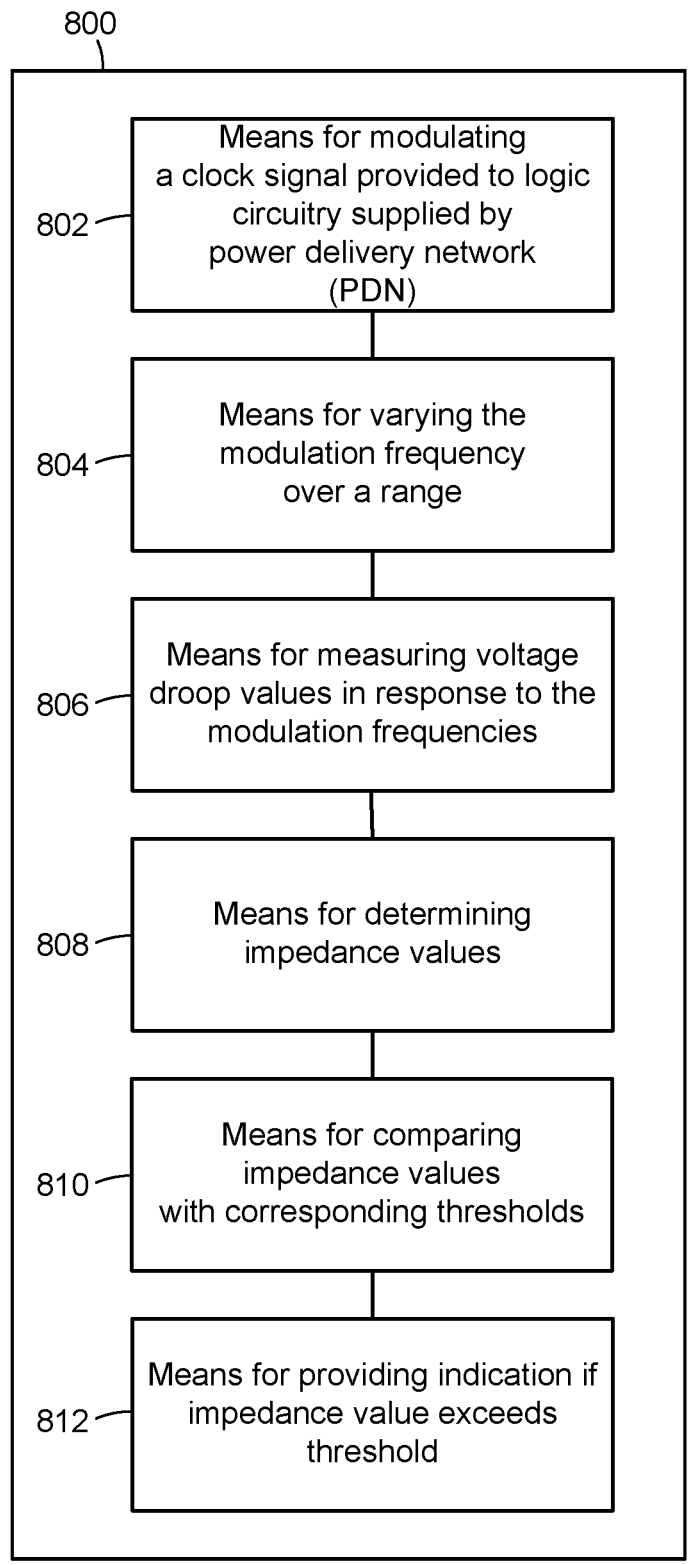
FIG. 8 is a functional block diagram of an apparatus for detecting PDN degradation in a computing device, in accordance with exemplary embodiments.

FIG. 8 is a functional block diagram of an apparatus 800 for detecting PDN degradation. The apparatus 800 may include means 802 for modulating a clock signal provided to logic circuitry supplied by the PDN. In an exemplary embodiment, the means 802 may be configured to perform one or more of the functions described above with regard to block 702 of the method 700 (FIG. 7). In an exemplary embodiment, the means 802 may include the test control circuitry 420 described above with regard to FIG. 4, or the test control circuitry 420 in combination with the logical-AND gate 410 (FIG. 4) or other clock gating circuit.

The apparatus 800 may include means 804 for varying the modulation frequency over a range. In an exemplary embodiment, the means 804 may be configured to perform one or more of the functions described above with regard to block 704 (FIG. 7). In an exemplary embodiment, the means 804 may include the test control circuitry 420 (FIG. 4).

The apparatus 800 may include means 806 for measuring voltage droop values. In an exemplary embodiment, the means 806 may be configured to perform one or more of the functions described above with regard to block 706 (FIG. 7). In an exemplary embodiment, the means 806 may include the test control circuitry 420 (FIG. 4) or the test control circuitry 420 in combination with the voltage sensors 418 (FIG. 4).

The apparatus 800 may include means 808 for determining impedance values. In an exemplary embodiment, the means 808 may be configured to perform one or more of the functions described above with regard to block 708 (FIG. 7). In an exemplary embodiment, the means 804 may include the test control circuitry 420 (FIG. 4).

The apparatus 800 may include means 810 for comparing the impedance values with corresponding thresholds. In an exemplary embodiment, the means 810 may be configured to perform one or more of the functions described above with regard to block 710 (FIG. 7). In an exemplary embodiment, the means 804 may include the test control circuitry 420 (FIG. 4).

The apparatus 800 may include means 812 for providing an indication if it is determined that an impedance value exceeds the threshold. In an exemplary embodiment, the means 812 may be configured to perform one or more of the functions described above with regard to block 712 (FIG. 7). In an exemplary embodiment, the means 804 may include the test control circuitry 420 (FIG. 4).

Implementation examples are described in the following numbered clauses:

1. A method for detecting power delivery network degradation, comprising:
modulating, by clock modulation circuitry, a clock signal provided to logic circuitry supplied by the power delivery network, including gating the clock signal alternately on and off at a duty cycle of a modulation signal, the modulation signal having a modulation frequency;
varying, by test control circuitry, the modulation frequency over a range;
measuring, by voltage measurement circuitry, a plurality of voltage droop values of a signal in the logic circuitry in response to each of a corresponding plurality of modulation frequencies in the range;
determining, by the test control circuitry, a plurality of impedance values, including determining a value of an odd harmonic of each of the plurality of voltage droop values;
comparing, by the test control circuitry, each of the plurality of impedance values with a corresponding threshold; and
providing, by the test control circuitry, an indication when at least one of the impedance values exceeds the corresponding threshold.

2. The method of clause 1, wherein determining the value of the odd harmonic of each of the plurality of voltage droop values comprises performing a Fast Fourier Transform on each of the plurality of voltage droop values.

3. The method of clause 1 or 2, wherein the method is performed during booting of a system having the logic circuitry.

4. The method of any of clauses 1-3, wherein the method is performed during mission-mode operation of a system having the logic circuitry.

5. The method of any of clauses 1-4, wherein the logic circuitry and the test control circuitry are included in a system-on-a-chip (SoC).

6. The method of any of clauses 1-5, wherein the logic circuitry and the test control circuitry are included in an automotive vehicle control system.

7. The method of clause 6, further comprising, based on the indication, at least one of: alerting a vehicle operator; or entering the vehicle into a fail-safe mode.

8. The method of any of clauses 1-7, wherein measuring the plurality of voltage droop values of a signal comprises measuring, by a plurality of voltage sensors, a corresponding plurality of voltage values, and determining an average of the plurality of voltage values.

9. A system for detecting power delivery network degradation, comprising:
at least one voltage sensor coupled to a signal path in logic circuitry powered by the power delivery network;
clock modulation circuitry configured to modulate a clock signal and provide a modulated clock signal to the logic circuitry in response to a modulation signal, including being configured to gate the clock signal alternately on and off at a duty cycle of the modulation signal; and
test control circuitry configured to:
provide the modulation signal to the clock modulation circuitry;
vary a modulation frequency of the modulation signal over a range;
receive a plurality of voltage droop values from the at least one voltage sensor in response to each of a corresponding plurality of modulation frequencies in the range;

determine a plurality of impedance values, including being configured to determine a value of an odd harmonic of each of the plurality of voltage droop values;

compare each of the plurality of impedance values with a corresponding threshold; and provide an indication when at least one of the impedance values exceeds the corresponding threshold.

10. The system of clause 9, wherein the test control circuitry is configured to determine the value of the odd harmonic of each of the plurality of voltage droop values by performing a Fast Fourier Transform on each of the plurality of voltage droop values.

11. The system of clause 9 or 10, wherein the test control circuitry is configured to operate during booting of a system having the logic circuitry.

12. The system of any of clauses 9-11, wherein the test control circuitry is configured to operate during mission-mode operation of a system having the logic circuitry.

13. The system of any of clauses 9-12, wherein the test control circuitry is included in a system-on-a-chip (SoC).

14. The system of any of clauses 9-13, wherein the test control circuitry is included in an automotive vehicle control system.

15. The system of clause 14, wherein the test control circuitry is further configured to control at least one of: alerting a vehicle operator; or entering the vehicle into a fail-safe mode.

16. The system of any of clauses 9-15, wherein the test control circuitry is configured to determine an average of a plurality of voltage values received from a plurality of voltage sensors.

17. An apparatus for detecting power delivery network degradation, comprising:

means for modulating a clock signal provided to logic circuitry supplied by the power delivery network, including means for gating the clock signal alternately on and off at a duty cycle of a modulation signal, the modulation signal having a modulation frequency;

means for varying the modulation frequency over a range;

means for measuring a plurality of voltage droop values of a signal in the logic circuitry in response to each of a corresponding plurality of modulation frequencies in the range;

means for determining a plurality of impedance values, including determining a value of an odd harmonic of each of the plurality of voltage droop values;

means for comparing each of the plurality of impedance values with a corresponding threshold; and means for providing an indication when at least one of the impedance values exceeds the corresponding threshold.

18. The apparatus of clause 17, wherein the means for determining the value of the odd harmonic of each of the plurality of voltage droop values comprises means for performing a Fast Fourier Transform on each of the plurality of voltage droop values.

19. The apparatus of clause 17 or 18, wherein the apparatus operates during booting of a system having the logic circuitry.

20. The apparatus of any of clauses 17-19, wherein the apparatus operates during mission-mode operation of a system having the logic circuitry.

21. The apparatus of any of clauses 17-20, wherein the logic circuitry and the test control circuitry are included in a system-on-a-chip (SoC).

22. The apparatus of any of clauses 17-21, wherein the logic circuitry is included in an automotive vehicle control system.

23. The apparatus of clause 22, further comprising at least one of: means for alerting a vehicle operator based on the indication; or means for entering the vehicle into a fail-safe mode based on the indication.

24. The apparatus of any of clauses 17-23, wherein the means for measuring the plurality of voltage droop values of a signal comprises means for determining an average of a plurality of measured voltage values.

25. A computer-readable medium for detecting power delivery network degradation, the computer-readable medium comprising a non-transitory computer-readable medium having instructions stored thereon in computer-executable form, the instructions when executed by a processing system configuring the processing system to:

control modulation of a clock signal provided to logic circuitry powered by the power delivery network using a modulation signal, including configuring the processing system to control gating the clock signal alternately on and off at a duty cycle of the modulation signal, and to vary a frequency of modulation of the clock signal over a range;

receive a plurality of voltage droop values from a voltage sensor in response to each of a corresponding plurality of modulation frequencies in the range;

determine a plurality of impedance values, including being configured to determine a value of an odd harmonic of each of the plurality of voltage droop values;

compare each of the plurality of impedance values with a corresponding threshold; and provide an indication when at least one of the impedance values exceeds the corresponding threshold.

26. The computer-readable medium of clause 25, wherein the processing system is configured to determine the value of the odd harmonic of each of the plurality of voltage droop values by performing a Fast Fourier Transform on each of the plurality of voltage droop values.

27. The computer-readable medium of clause 25 or 26, wherein processing system is configured to detect power delivery network degradation during booting of a system having the logic circuitry.

28. The computer-readable medium of any of clauses 25-27, wherein the processing system is configured to detect power delivery network degradation during mission-mode operation of a system having the logic circuitry.

29. The computer-readable medium of any of clauses 25-28, wherein the logic circuitry and the processing system are included in a system-on-a-chip (SoC).

30. The computer-readable medium of any of clauses 25-29, wherein the logic circuitry and the processing system are included in an automotive vehicle control system.

Although selected aspects have been illustrated and described in detail, it will be understood that various substitutions and alterations may be made therein without departing from the scope of the present invention, as defined by the following claims.

What is claimed is:

1. A method for detecting automotive vehicle control system-on-a-chip (SoC) power delivery network degradation, comprising:

modulating, by clock modulation circuitry of the (SoC), a clock signal provided to logic circuitry of the SoC supplied by the SoC power delivery network, including gating the clock signal alternately on and off at a duty cycle of a modulation signal, the modulation signal having a modulation frequency;

varying, by test control circuitry of the SoC, the modulation frequency over a range;

measuring, by voltage measurement circuitry, a plurality of voltage droop values of a signal in the logic circuitry in response to each of a corresponding plurality of modulation frequencies in the range;

determining, by the test control circuitry, a plurality of impedance values, including determining a value of an odd harmonic of each of the plurality of voltage droop values;

comparing, by the test control circuitry, each of the plurality of impedance values with a corresponding threshold; and providing, by the test control circuitry, an indication when at least one of the impedance values exceeds the corresponding threshold;

wherein the method is performed when booting the SoC when the automotive vehicle is readied for operation.

2. The method of claim 1, wherein determining the value of the odd harmonic of each of the plurality of voltage droop values comprises performing a Fast Fourier Transform on each of the plurality of voltage droop values.

3. The method of claim 1, wherein the method is performed during mission-mode operation of a system having the logic circuitry.

4. The method of claim 1, further comprising alerting a vehicle operator based on the indication.

5. The method of claim 1, further comprising, based on the indication, entering the vehicle into a fail-safe mode.

6. The method of claim 1, wherein measuring the plurality of voltage droop values of a signal comprises measuring, by a plurality of voltage sensors, a corresponding plurality of voltage values, and determining an average of the plurality of voltage values.

7. A system for detecting automotive vehicle control system-on-a-chip (SoC) power delivery network degradation, comprising:

at least one voltage sensor in the SoC coupled to a signal path in logic circuitry of the SoC powered by the SoC power delivery network;

clock modulation circuitry in the SoC configured to modulate a clock signal and provide a modulated clock signal to the logic circuitry in response to a modulation signal, including being configured to gate the clock signal alternately on and off at a duty cycle of the modulation signal; and test control circuitry in the SoC configured to, when booting the SoC when the automotive vehicle is readied for operation:

provide the modulation signal to the clock modulation circuitry;

vary a modulation frequency of the modulation signal over a range;

receive a plurality of voltage droop values from the at least one voltage sensor in response to each of a corresponding plurality of modulation frequencies in the range;

determine a plurality of impedance values, including being configured to determine a value of an odd harmonic of each of the plurality of voltage droop values;

compare each of the plurality of impedance values with a corresponding threshold; and provide an indication when at least one of the impedance values exceeds the corresponding threshold.

8. The system of claim 7, wherein the test control circuitry is configured to determine the value of the odd harmonic of each of the plurality of voltage droop values by performing a Fast Fourier Transform on each of the plurality of voltage droop values.

9. The system of claim 7, wherein the test control circuitry is configured to operate during mission-mode operation of a system having the logic circuitry.

10. The system of claim 7, wherein the test control circuitry is further configured to control alerting a vehicle operator based on the indication.

11. The system of claim 7, wherein the test control circuitry is further configured to control entering the vehicle into a fail-safe mode based on the indication.

12. The system of claim 7, wherein the test control circuitry is configured to determine an average of a plurality of voltage values received from a plurality of voltage sensors.

13. An apparatus for detecting automotive vehicle control system-on-a-chip (SoC) power delivery network degradation, comprising:

means for, when booting the SoC when an automotive vehicle is readied for operation, modulating a clock signal provided to logic circuitry supplied by the SoC power delivery network, including means for gating the clock signal alternately on and off at a duty cycle of a modulation signal, the modulation signal having a modulation frequency;

means for, when booting the SoC when the automotive vehicle is readied for operation, varying the modulation frequency over a range;

means for, when booting the SoC when the automotive vehicle is readied for operation, measuring a plurality of voltage droop values of a signal in the logic circuitry in response to each of a corresponding plurality of modulation frequencies in the range;

means for, when booting the SoC when the automotive vehicle is readied for operation, determining a plurality of impedance values, including determining a value of an odd harmonic of each of the plurality of voltage droop values;

means for, when booting the automotive SoC when the automotive vehicle is readied for operation, comparing each of the plurality of impedance values with a corresponding threshold; and means for, when booting the SoC when the automotive vehicle is readied for operation, providing an indication when at least one of the impedance values exceeds the corresponding threshold.

14. The apparatus of claim 13, wherein the means for determining the value of the odd harmonic of each of the plurality of voltage droop values comprises means for performing a Fast Fourier Transform on each of the plurality of voltage droop values.

15. The apparatus of claim 13, wherein the apparatus operates during mission-mode operation of a system having the logic circuitry.

16. The apparatus of claim 13, further comprising means for alerting a vehicle operator based on the indication.

17. The apparatus of claim 13, further comprising means for entering the vehicle into a fail-safe mode based on the indication.

18. The apparatus of claim 13, wherein the means for measuring the plurality of voltage droop values of a signal comprises means for determining an average of a plurality of measured voltage values.

19. A computer-readable medium for detecting automotive vehicle control system-on-a-chip (SoC) power delivery network degradation, the computer-readable medium comprising a non-transitory computer-readable medium having instructions stored thereon in computer-executable form, the instructions when executed by a processing system of the SoC configuring the processing system to, when booting the SoC when an automotive vehicle is readied for operation:

control modulation of a clock signal provided to logic circuitry of the SoC powered by the SoC power delivery network using a modulation signal, including configuring the processing system to control gating the clock signal alternately on and off at a duty cycle of the modulation signal, and to vary a frequency of modulation of the clock signal over a range;

receive a plurality of voltage droop values from a voltage sensor in the SoC in response to each of a corresponding plurality of modulation frequencies in the range;

determine a plurality of impedance values, including being configured to determine a value of an odd harmonic of each of the plurality of voltage droop values;

compare each of the plurality of impedance values with a corresponding threshold; and provide an indication when at least one of the impedance values exceeds the corresponding threshold.

20. The computer-readable medium of claim 19, wherein the processing system is configured to determine the value of the odd harmonic of each of the plurality of voltage droop values by performing a Fast Fourier Transform on each of the plurality of voltage droop values.

21. The computer-readable medium of claim 19, wherein the processing system is configured to detect power delivery network degradation during mission-mode operation of a system having the logic circuitry.

22. The computer-readable medium of claim 19, wherein the processing system is configured to alert a vehicle operator based on the indication.

23. The computer-readable medium of claim 19, wherein the processing system is configured to enter the vehicle into a fail-safe mode based on the indication.

* * * * *